United States Patent
Xu et al.

(10) Patent No.: US 11,158,930 B2
(45) Date of Patent: Oct. 26, 2021

(54) ANTENNA DEVICE AND MOBILE APPARATUS

(71) Applicant: BOE TECHNOLOGY GROUP CO., LTD., Beijing (CN)

(72) Inventors: Jian Xu, Beijing (CN); Xinyin Wu, Beijing (CN); Yongchun Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 628 days.

(21) Appl. No.: 16/073,018

(22) PCT Filed: Nov. 22, 2017

(86) PCT No.: PCT/CN2017/112295
§ 371 (c)(1),
(2) Date: Jul. 26, 2018

(87) PCT Pub. No.: WO2018/188344
PCT Pub. Date: Oct. 18, 2018

(65) Prior Publication Data
US 2021/0167486 A1 Jun. 3, 2021

(30) Foreign Application Priority Data
Apr. 14, 2017 (CN) .......................... 201710245575.3

(51) Int. Cl.
*H01Q 1/24* (2006.01)
*H01P 1/18* (2006.01)
(Continued)

(52) U.S. Cl.
CPC ............... *H01Q 1/243* (2013.01); *H01P 1/18* (2013.01); *H01Q 1/38* (2013.01); *H01Q 3/36* (2013.01); *H01Q 3/44* (2013.01)

(58) Field of Classification Search
CPC ............ H01Q 1/243; H01Q 1/38; H01Q 3/36; H01Q 3/44
See application file for complete search history.

(56) References Cited

U.S. PATENT DOCUMENTS

2013/0040655 A1   2/2013  Keidar
2014/0266897 A1   9/2014  Jakoby et al.
(Continued)

FOREIGN PATENT DOCUMENTS

CN   105589269 A    5/2016
WO   2016180497 A1  11/2016
WO   2017061527 A1  4/2017

OTHER PUBLICATIONS

Extended European Search Report dated Dec. 18, 2020 corresponding to application No. 17892071.6-1205.

*Primary Examiner* — Hoang V Nguyen
(74) *Attorney, Agent, or Firm* — Nath, Goldberg & Meyer; Joshua B. Goldberg

(57) ABSTRACT

An antenna device and a mobile apparatus including the antenna device are provided. The antenna device includes: a direction detector configured to detect moving direction of the mobile apparatus where the antenna device is located and generate a direction signal indicating the moving direction; a driver connected to the direction detector and configured to generate corresponding driving voltage signal according to the direction signal from the direction detector; an antenna element connected to the driver and configured to transmit and receive electromagnetic wave, wherein the antenna element includes a first liquid crystal layer, an area where the first liquid crystal layer is located is divided into resonance regions, the antenna element separately adjusts dielectric constant of the first liquid crystal layer within each of the resonance regions according to the driving voltage signal, to transmit and receive electromagnetic wave in the moving direction corresponding to the driving voltage signal.

16 Claims, 4 Drawing Sheets

(51) Int. Cl.
*H01Q 1/38* (2006.01)
*H01Q 3/36* (2006.01)
*H01Q 3/44* (2006.01)

(56) References Cited

U.S. PATENT DOCUMENTS

2016/0218429 A1    7/2016   Klemes
2017/0111852 A1*   4/2017   Selen .................... H04W 48/16

* cited by examiner

ANTENNA DEVICE AND MOBILE APPARATUS

CROSS-REFERENCE TO RELATED APPLICATIONS

This is a National Phase Application filed under 35 U.S.C. 371 as a national stage of PCT/CN2017/112295, filed Nov. 22, 2017, an application claiming the benefit of Chinese Application No. 201710245575.3, filed Apr. 14, 2017, the content of each of which is hereby incorporated by reference in its entirety.

TECHNICAL FIELD

The present disclosure relates to the field of communication technology, and in particular, relates to an antenna device and a mobile apparatus.

BACKGROUND

A mobile apparatus is used for operations such as phone calling and Internet surfing in various situations. Nowadays, a mobile apparatus generally applies a non-directional antenna device, and signals emitted by the mobile apparatus are transmitted with equal intensity in all directions by the non-directional antenna device. This will cause a problem that, when the mobile apparatus is moving at a high speed (for example, when a user uses the mobile apparatus while traveling in a high speed train or driving on a motorway), communication delay is likely to occur due to continuous reception of and communication with a previous cell signal.

SUMMARY

In one aspect, the present disclosure provides an antenna device, including:

a direction detector configured to detect a moving direction of the antenna device and generate a direction signal indicating the moving direction; a driver connected to the direction detector and configured to generate a corresponding driving voltage signal according to the direction signal; and an antenna element connected to the driver, wherein the antenna element includes a first liquid crystal layer, an area where the first liquid crystal layer is located is divided into a plurality of resonance regions, the antenna element is configured to separately adjust a dielectric constant of the first liquid crystal layer within each of the resonance regions according to the driving voltage signal, to transmit and receive electromagnetic wave in the moving direction corresponding to the driving voltage signal.

According to an embodiment of the present disclosure, the antenna element further includes a driving electrode layer on at least one side of the first liquid crystal layer, and an antenna electrode layer at a side of the first liquid crystal layer and insulated and spaced apart from the driving electrode layer.

The driving electrode layer is connected to the driver, and configured to generate mutually independent electric fields in respective resonance regions in the first liquid crystal layer according to the driving voltage signal, so as to adjust dielectric constants of the respective resonance regions of the first liquid crystal layer.

The antenna electrode layer is configured to transmit and receive electromagnetic wave under the effects of the electric fields of the respective resonance regions, and cause phase distribution of the electromagnetic wave to correspond to dielectric constants of the respective resonance regions.

According to an embodiment of the present disclosure, the driving electrode layer includes a first electrode layer and a second electrode layer at two opposite sides of the first liquid crystal layer, respectively, at least one of the first electrode layer and the second electrode layer includes a plurality of driving sub-electrodes insulated and spaced apart from each other, and the driving sub-electrodes have one-to-one correspondence with the resonance regions.

The antenna electrode layer is at a side of the first electrode layer facing away the first liquid crystal layer, the antenna electrode layer includes a plurality of antenna sub-electrodes spaced apart from each other, and each of the resonance regions corresponds to at least one of the antenna sub-electrodes.

According to an embodiment of the present disclosure, the direction detector includes a gyroscope and an accelerometer.

According to an embodiment of the present disclosure, each of the antenna sub-electrodes is formed with a through hole, and each of the resonance regions corresponds to rows and columns of the antenna sub-electrodes.

According to an embodiment of the present disclosure, the antenna electrode layer is at a side of the first electrode layer facing away the first liquid crystal layer, and the antenna electrode layer includes a plurality of antenna sub-electrodes spaced apart from each other. The driving electrode layer includes a first electrode layer and a second electrode layer at two opposite sides of the first liquid crystal layer, respectively, at least one of the first electrode layer and the second electrode layer includes a plurality of driving sub-electrodes insulated and spaced apart from each other, and each of the resonance regions corresponds to at least one of the plurality of driving sub-electrodes. The driver further includes a transmitter configured to generate a magnitude control voltage signal. The antenna element further includes a power distribution electrode layer at a side of the second electrode layer facing away the first liquid crystal layer, the power distribution electrode layer includes a plurality of power distribution sub-electrodes having one-to-one correspondence with the resonance regions, the power distribution sub-electrodes are connected to the transmitter, and configured to load the magnitude control voltage signal to adjust magnitudes of electromagnetic wave transmitted by respective resonance regions according to the magnitude control voltage signal. An orthographic projection of each of the power distribution sub-electrodes on a plane where the first substrate is located at least partially overlaps with an orthographic projection of at least one of the antenna sub-electrodes on the plane where the first substrate is located.

According to an embodiment of the present disclosure, one of the first electrode layer and the second electrode layer includes the plurality of driving sub-electrodes, and the other is a single plate electrode.

According to an embodiment of the present disclosure, the antenna element further includes a first substrate and a second substrate opposite to each other, and the first liquid crystal layer is between the first substrate and the second substrate.

In another aspect, the present disclosure further provides a mobile apparatus including the above antenna device according to the present disclosure.

According to an embodiment of the present disclosure, the mobile apparatus further includes a display panel, which includes an array substrate and a counter substrate opposite to each other and a second liquid crystal layer between the array substrate and the counter substrate, in a case where the antenna element further includes a first substrate and a second substrate opposite to each other and a first liquid crystal layer is between the first substrate and the second substrate, the first liquid crystal layer and the second liquid crystal layer are at a same level, the first substrate and the counter substrate form an integral structure, and the second substrate and the array substrate form an integral structure.

According to an embodiment of the present disclosure, the antenna element is at an edge of the display panel.

According to an embodiment of the present disclosure, the direction detector includes a gyroscope.

According to an embodiment of the present disclosure, the direction signal generated by the direction detector undergoes a data calibration of the antenna element.

BRIEF DESCRIPTION OF THE DRAWINGS

The accompanying drawings, which constitute a part of the specification, are provided for further understanding of the present disclosure, and for explaining the present disclosure along with the following specific implementations, but not intended to limit the present disclosure, in which.

DETAILED DESCRIPTION

Specific implementations of the present disclosure will be described in detail below in conjunction with the accompanying drawings. It should be understood that the specific implementations described herein are solely for the purpose of explaining and interpreting the present disclosure rather than limiting the present disclosure.

Figure 1:
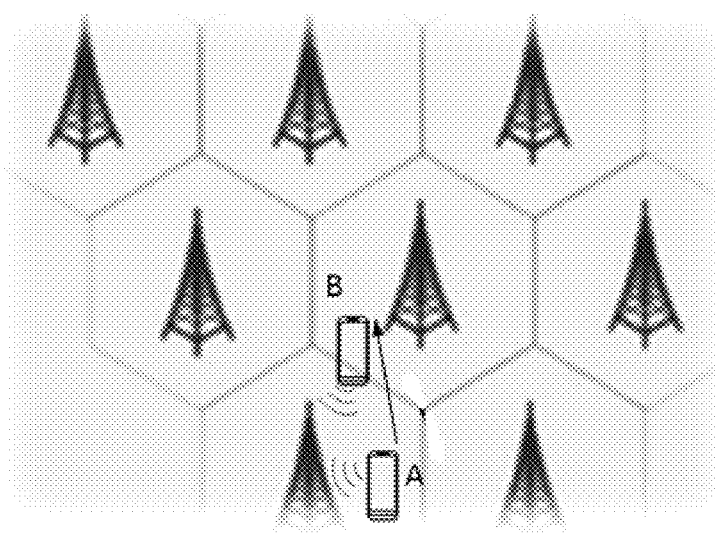
FIG. 1 is a schematic diagram showing a communication relationship between a mobile apparatus according to the prior art and a base station of each of two cells when the mobile apparatus is moving between the two cells.

As shown in FIG. 1, it has been discovered that in the prior art, when a mobile apparatus is in a cell where a position A is located, the mobile apparatus has established a signal connection with a base station of the cell where the position A is located. Then, when the mobile apparatus moves at a high speed from the position A to a position B, the mobile apparatus still expects to establish a connection with the signal cell where the position A is located, even if it arrives at the position B. However, at this time, a signal intensity from the signal cell where the position A is located is already very weak, which is likely to result in communication delay and data loss in connection with the mobile apparatus. If this happens repeatedly, it is even more likely that the mobile apparatus cannot establish a connection with the cell where the position B is located, causing communication delay.

Accordingly, the present disclosure provides, inter alia, an antenna device and a mobile apparatus, which causes a moving mobile apparatus to receive and transmit signals in a moving direction, thereby achieving a faster response and better communication effects when a mobile apparatus is shifting between base stations.

Figure 2:
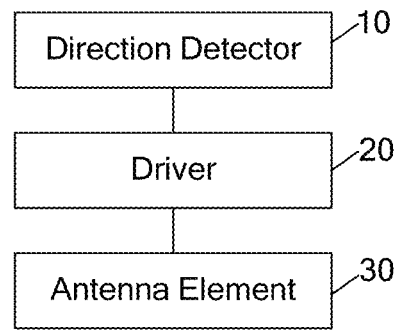
FIG. 2 is a schematic diagram showing a functional structure of an antenna device according to the present disclosure.
Figure 5:
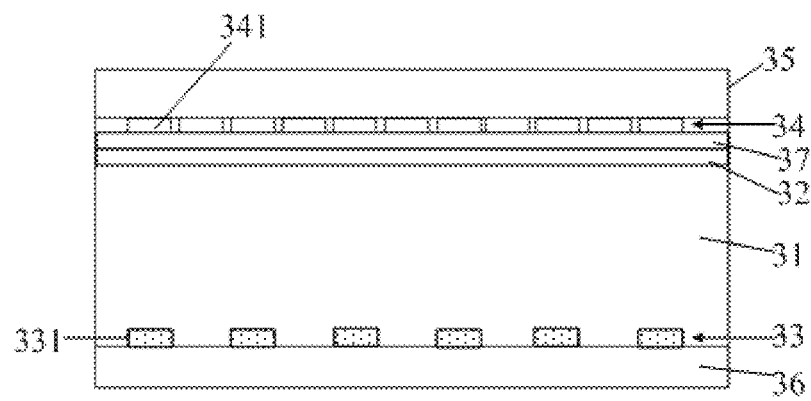
FIG. 5 is a sectional view taken along line A-A' in the antenna element of FIG. 4.
Figure 7:
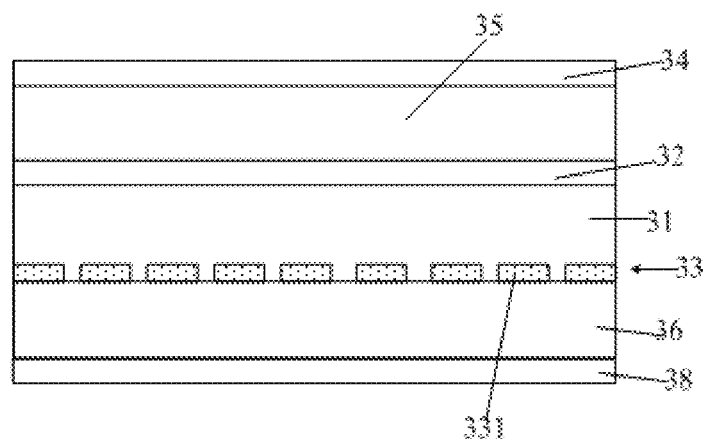
FIG. 7 is a sectional view taken along line B-B' in the antenna element of FIG. 6.

As an aspect of the present disclosure, there is provided an antenna device. As shown in FIG. 2, the antenna device includes a direction detector 10, a driver 20 and an antenna element 30. The direction detector 10 is configured to detect a moving direction of the antenna device and generate a direction signal indicating the moving direction. The driver 20 includes a data processor, a transmitter and a receiver (not illustrated), and is connected to the direction detector 10, and is configured to generate a corresponding driving voltage signal according to the direction signal from the direction detector 10. The antenna element 30 is connected to the driver 20, and is configured to transmit and receive electromagnetic wave. FIGS. 5 and 7 are sectional views of two structures of the antenna element. As shown in FIGS. 5 and 7, the antenna element 30 includes a first liquid crystal layer 31. An area where the first liquid crystal layer 31 is located is divided into a plurality of resonance regions, and the antenna element 30 separately adjusts a dielectric constant of the first liquid crystal layer 31 within each resonance region according to the driving voltage signal, to transmit and receive electromagnetic wave in the moving direction corresponding to the driving voltage signal. It should be understood that the term "connection" in the present disclosure may refer to either a wired signal connection or a wireless signal connection.

When an antenna signal is transmitted, a phase of electromagnetic wave transmitted from each resonance region is adjusted by adjusting a dielectric constant of the first liquid crystal layer 31 within each resonance region according to the corresponding driving voltage signal generated from the direction signal, so that a direction of the equiphase surface is adjusted. Since the direction of the electromagnetic wave beam emitted by the antenna is perpendicular to the equiphase surface, an overall direction of the emitted electromagnetic wave beam can be adjusted. Similarly, when receiving base station signals and if dielectric constants are distributed differently among the resonance regions, the antenna element 30 receives signals at different intensities in different directions, and thus, when receiving base station signals, the dielectric constant of each resonance region is adjusted according to the driving voltage signal generated from the direction signal for the moving direction, so that the antenna element receives a base station signal at the strongest intensity in the moving direction, and receives base station signals at lower or zero intensities in other directions, thereby achieving reception of the base station signal in the moving direction only.

Figure 3:
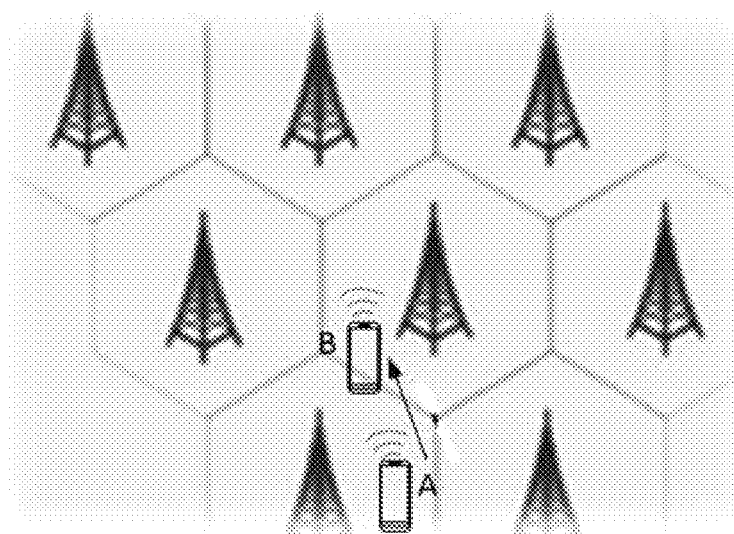
FIG. 3 is a schematic diagram showing a communication relationship between a mobile apparatus according to the present disclosure and a base station of each of two cells when the mobile apparatus is moving between the two cells.

After the direction detector 10 detects the moving direction of the mobile apparatus, the antenna element 30 transmits and receives electromagnetic wave mainly in the moving direction of the mobile apparatus, that is, the antenna element 30 transmits an antenna signal in the moving direction and receives a base station signal in the moving direction. Thus, when the mobile apparatus shifts its position between two cells of neighboring base stations (moves from position A to position B as in FIG. 3), once the antenna device receives a signal from the cell where the position B is located, it preferentially establishes a connection with a base station of the cell where the position B is located, and quickly shifts the signal cell, thereby reducing incidents of communication delay in the prior art and improving communication effects.

Specifically, the direction detector may include a gyroscope and an accelerometer. The moving direction of the mobile apparatus can be determined accurately and quickly by using the accelerometer to detect an initial motion state and the gyroscope to measure an angle of the moving direction. Further, optionally, the direction detector may include a gyroscope only, in which case the gyroscope should at least contain 6 axes, and when the mobile apparatus has motion offsets in horizontal and vertical directions, the gyroscope may measure angles in multiple moving directions simultaneously, and the moving direction calculated by the gyroscope is modified in consideration of a base station position indicated by data of the base station initially connected to the antenna element of the mobile apparatus and a position indicated by data of the base station connected in the next moment, to generate the direction signal.

Two specific structures of the antenna element are described below in conjunction with FIGS. 4 to 7. A first specific structure of the antenna element 30 may employ supermaterial liquid crystal. As shown in FIG. 5, the antenna element 30 includes the above-described first liquid crystal layer 31, a driving electrode layer disposed at both sides of the first liquid crystal layer 31, an antenna electrode layer 34 disposed at a side of the first liquid crystal layer 31 and insulated and spaced apart from the driving electrode layer. The driving electrode layer is connected to the driver 20, and is configured to generate mutually independent electric fields in respective resonance regions in the first liquid crystal layer 31 according to the driving voltage signal from the driver 20, to adjust dielectric constants of the respective resonance regions of the first liquid crystal layer 31. It is to be noted that the driving voltage signal generated by the driver 20 does not refer to a specific value; rather, it is a generic term referring to voltage signals supplied to the respective resonance regions. The antenna electrode layer 34 is configured to transmit and receive electromagnetic wave under the effects of the electric fields of the respective resonance regions, and cause phase distribution of the electromagnetic wave to correspond to dielectric constants of the respective resonance regions, so that the direction in which the electromagnetic wave is transmitted and received coincides with the moving direction corresponding to the driving voltage signal.

The driving electrode layer includes a first electrode layer 32 and a second electrode layer 33 disposed at two opposite sides of the first liquid crystal layer 31, respectively. At least one of the first electrode layer 32 and the second electrode layer 33 includes a plurality of driving sub-electrodes 331 insulated and spaced apart from each other. When loading the driving voltage signal, a plurality of electric field regions, i.e. the resonance regions, are formed between the first electrode layer 32 and the second electrode layer 33. The driving sub-electrodes 331 have one-to-one correspondence with the resonance regions, so that electric fields of the respective resonance regions have very small influence on one another. The antenna electrode layer 34 is disposed at a side of the first electrode layer 32 facing away the first liquid crystal layer 31, and includes a plurality of antenna sub-electrodes 341 spaced apart from each other, and each of the resonance regions corresponds to at least one of the antenna sub-electrodes 341.

Figure 4:
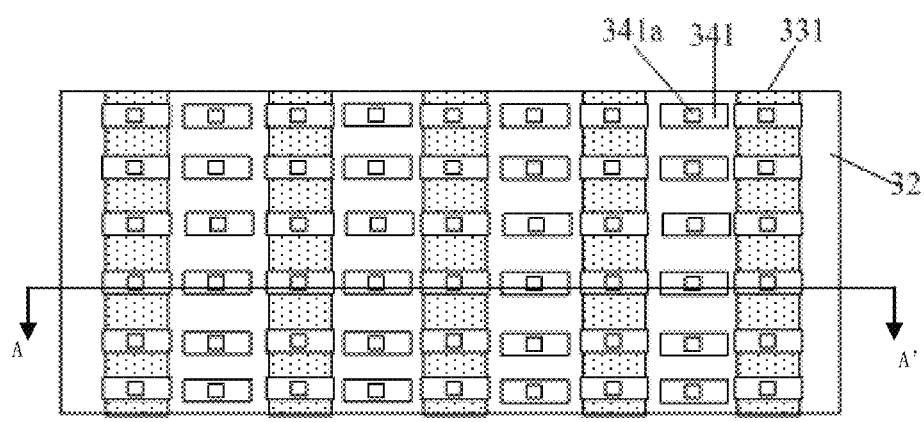
FIG. 4 is a perspective view observed from above showing a first structure of an antenna element of the antenna device according to the present disclosure.

Each of the antenna sub-electrodes 341 may be formed as a metal block having a certain shape, for example, as shown in FIG. 4, each of the antenna sub-electrodes 341 may be formed with a through hole 341a, to transmit electromagnetic wave outwards. Each of the resonance regions may correspond to rows and columns of antenna sub-electrodes 341, so that the electromagnetic wave is more densely distributed, which is more advantageous for precisely adjusting the direction of the electromagnetic wave transmitted and received.

Each of the first electrode layer 32 and the second electrode layer 33 may be provided as a structure including a plurality of driving sub-electrodes 331. In some embodiments of the present disclosure, in order to simplify manufacturing process, one of the first electrode layer 32 and the second electrode layer 33 is provided as a structure including a plurality of driving sub-electrodes 331, and the other is provided as a single continuous plate electrode. As shown in FIGS. 5 and 7, the first electrode layer 32 is a single continuous plate electrode, and the second electrode layer 33 includes a plurality of driving sub-electrodes 331.

As shown in FIG. 5, the antenna element 30 may further include a first substrate 35 and a second substrate 36 disposed opposite to each other. The first liquid crystal layer 31 is disposed between the first substrate 35 and the second substrate 36, the first electrode layer 32 is disposed between the first substrate 35 and the first liquid crystal layer 31, the second electrode layer 33 is disposed between the first liquid crystal layer 31 and the second substrate 36, the antenna electrode layer 34 is disposed between the first electrode layer 32 and the first substrate 35, and an insulation layer 37 is disposed between the antenna electrode layer 34 and the first electrode layer 32. Needless to say, the antenna electrode layer 34 may also be disposed at a side of the first substrate 35 facing away the second substrate 36.

Figure 6:
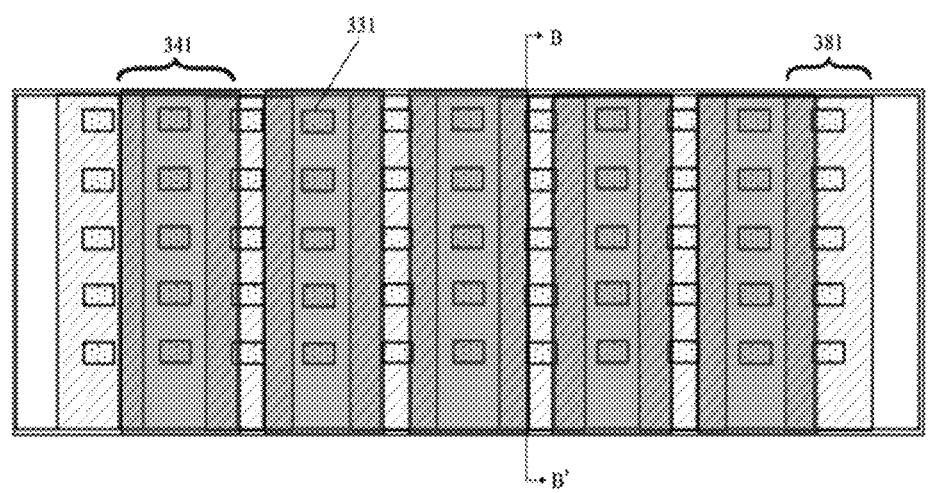
FIG. 6 is a perspective view observed from above showing a second structure of an antenna element of the antenna device according to the present disclosure.

A second specific structure of the antenna element 30 may employ a liquid crystal phased-array antenna. As shown in FIGS. 6 and 7, the antenna sub-electrodes 341 may be bar-shaped electrodes, and slits may be formed between adjacent antenna sub-electrodes 341, to transmit electromagnetic wave. The driver may further be configured to control a magnitude of the electromagnetic wave transmitted by the antenna element. As described above, the driver includes a transmitter, and the transmitter is configured to generate a magnitude control voltage signal. As shown in FIG. 6, there is also provided a power distribution electrode layer 38 at a side of the second electrode layer 33 facing away the first liquid crystal layer 31. The power distribution electrode layer 38 includes a plurality of power distribution sub-electrodes 381 having one-to-one correspondence with the resonance regions. The power distribution sub-electrodes 381 are connected to the transmitter, and are configured to load the magnitude control voltage signal generated by the transmitter, to adjust magnitudes of electromagnetic wave transmitted by respective resonance regions according to the magnitude control voltage signal, so as to transmit an antenna signal at a desired intensity. Each of the power distribution sub-electrodes may be associated with at least one antenna sub-electrode 341. For example, an orthographic projection of each of the power distribution sub-electrodes 381 on a plane where the first substrate is located may at least in part overlap with an orthographic projection of at least one of the antenna sub-electrodes 341 on the plane where the first substrate is located, as shown in FIG. 6, in which the regions indicated by slash shadows are power distribution sub-electrodes 381, and the regions indicated by gray shadows are antenna sub-electrodes 341. In this example, one of the power distribution sub-electrodes 381 may be associated with two of the antenna sub-electrodes 341, so that a corresponding one of the resonance regions has a dielectric constant influenced together by the two antenna sub-electrodes 341 and the one power distribution sub-electrode 381.

Similar to the first structure, in the second structure of the antenna element 30, one of the first electrode layer 32 and the second electrode layer 33 may include a plurality of driving sub-electrodes 331, the other may be a single continuous plate electrode, and each of the resonance regions may correspond to multiple driving sub-electrodes 331. For example, an orthographic projection of each of the antenna sub-electrodes 341 on the plane where the first substrate is located may cover an orthographic projection of a column of driving sub-electrodes 331 on the plane where the first substrate is located. Respective driving voltage signals are applied to the multiple driving sub-electrodes 331 corresponding to each resonance region by using the driver, and thus mutually independent electric fields are generated in respective resonance regions, to adjust dielectric constants of respective resonance regions. The antenna electrode layer 34 is configured to transmit and receive electromagnetic wave under the effects of the electric fields of the respective resonance regions, and cause phase distribution of the electromagnetic wave to correspond to dielectric constants of the respective resonance regions, so that the direction in which the electromagnetic wave is transmitted and received coincides with the moving direction corresponding to the driving voltage signal.

Furthermore, the second structure of the antenna element 31 also includes a first substrate 35 and a second substrate 36, as shown in FIG. 6. The first liquid crystal layer 31 is disposed between the first substrate 35 and the second substrate 36. Positions of the first electrode layer 32, the second electrode layer 33 and the antenna electrode layer 34 relative to the first substrate 35 and the second substrate 36 may be the same as those in the first structure. The power distribution electrode layer 38 may be either disposed between the second electrode layer 33 and the second substrate 36, or disposed at a side of the second substrate 36 facing away the second electrode layer 33. It should be understood that, in the antenna element 30 having either of the above-described two structures, regardless of how the first electrode layer 32, the second electrode layer 33, the antenna electrode layer 34 and the power distribution electrode layer 38 are disposed, it needs to be ensured that any two of them are insulated and spaced apart from each other. The layers illustrated in the embodiments are merely examples, there may be other functional layers between these layers, for example, there may be a planarization layer provided at a side of the first and second substrates facing the first liquid crystal layer 31.

As another aspect of the present disclosure, there is provided a mobile apparatus, including the above antenna device according to the present disclosure.

Figure 8:
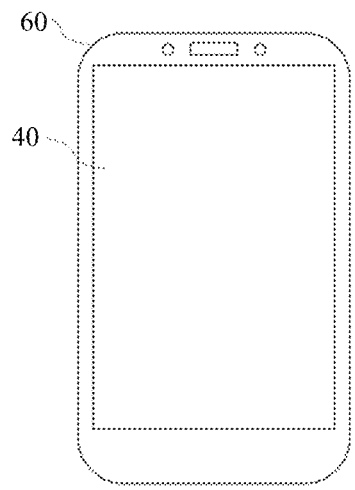
FIG. 8 is a schematic front view of a first structure of a mobile apparatus according to the present disclosure.
Figure 9:
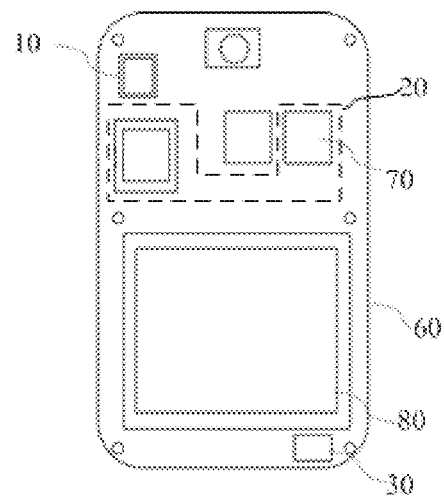
FIG. 9 is a schematic back view of the first structure of the mobile apparatus according to the present disclosure.
Figure 10:
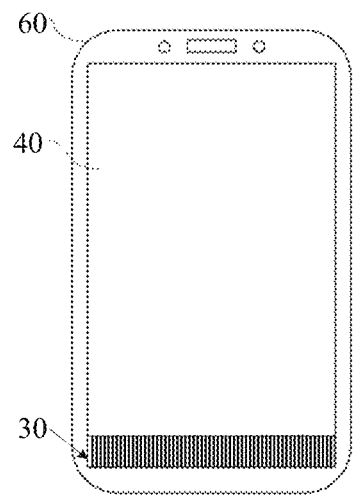
FIG. 10 is a schematic front view of a second structure of a mobile apparatus according to the present disclosure.
Figure 11:
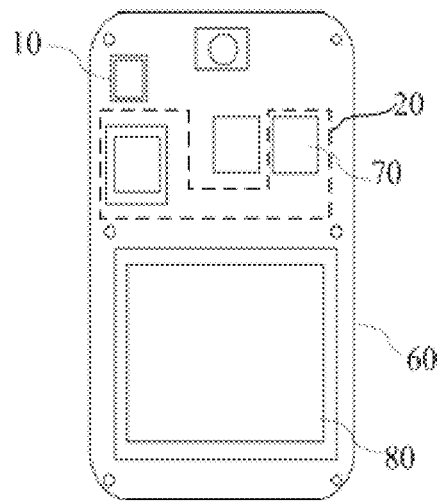
FIG. 11 is a schematic back view of the second structure of the mobile apparatus according to the present disclosure.
Figure 12:
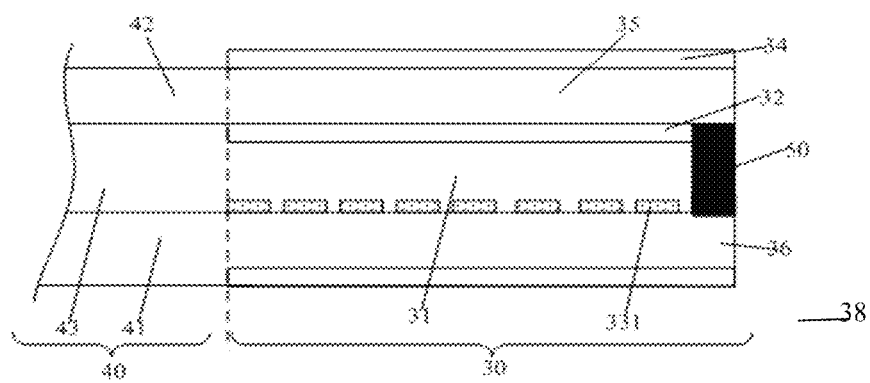
FIG. 12 is a schematic diagram showing that an antenna element is integrated with a display panel in a mobile apparatus according to the present disclosure.

The mobile apparatus of the present disclosure may specifically be a mobile phone. FIGS. 8 and 9 are schematic front and back views, respectively, of a mobile apparatus including the antenna element having the first structure; and FIGS. 10 and 11 are schematic front and back views, respectively, of a mobile apparatus including the antenna element having the second structure. As shown in FIGS. 8 to 11, the mobile apparatus includes structures such as a housing 60, a display panel 40, a communication chip 70 and a power supply 80. The display panel 40 is disposed on a front surface of the housing 60, and the communication chip 70, the power supply 80 and the direction detector 10 and the driver 20 of the above-described antenna device are disposed on a back surface of the housing 60. The driver 20 may be implemented as a collective structure containing the communication chip 70 and a transmitter and a receiver (not illustrated) connected to the antenna element 30, and the antenna element 30 of the antenna device may be disposed on the back surface of the housing 60 (as shown in FIG. 9), or may be disposed at a position on the front surface of the housing 60 close to a frame of the housing of the mobile phone (as shown in FIG. 10). When disposed on the front surface of the housing 60, the antenna element 30 may be integrated with the display panel 40, to simplify the overall structure. FIG. 12 is a schematic diagram showing that the antenna element 30 is integrated with the display panel 40, taking the above second structure of the antenna element 30 as an example. As shown in FIG. 12, the display panel 40 specifically includes an array substrate 41 and a counter substrate 42 disposed opposite to each other, and a second liquid crystal layer 43 disposed between the array substrate 41 and the counter substrate 42. The first liquid crystal layer 31 of the antenna element 30 and the second liquid crystal layer 43 of the display panel 40 are disposed in a same layer (for example, disposed at a same horizontal level), and there is provided a sealant 50 around the whole liquid crystal layer formed by the first liquid crystal layer 31 and the second liquid crystal layer 43. The first substrate 35 and the counter substrate 42 form an integral structure, and the second substrate 36 and the array substrate 41 form an integral structure. In this case, the driver connected to the antenna element 30 also includes a digital to analog conversion driving chip connected to the display panel.

Although FIGS. 8 to 11 do not illustrate connections between components, one can refer to the foregoing description for the connections between components in FIGS. 8 to 11. Connections between components which are not mentioned in the foregoing description are well known to a person skilled in the art, and thus are not described in further detail here.

The foregoing is a description of the antenna device and the mobile apparatus according to the present disclosure. It can be seen that, due to the direction detector of the antenna device, in particular, after a moving direction of the mobile apparatus is detected by using a gyroscope and an accelerometer, the antenna element transmits and receives electromagnetic wave mainly in the moving direction of the mobile apparatus, that is, the antenna element transmits an antenna signal in the moving direction and receives a base station signal in the moving direction. Thus, when the mobile apparatus shifts its position between two cells of neighboring base stations, once the antenna device receives a signal from the next cell, it preferentially establishes a connection with a base station of the next cell, and quickly shifts the signal cell, thereby reducing incidents of communication delay in the prior art and improving communication effects. In the mobile apparatus, the antenna element of the antenna device may be integrated with the display panel, which further simplifies an overall structure of the mobile apparatus.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. An antenna device, comprising:
a direction detector configured to detect a moving direction of the antenna device and generate a direction signal indicating the moving direction;
a driver connected to the direction detector and configured to generate a corresponding driving voltage signal according to the direction signal; and
an antenna element connected to the driver, wherein the antenna element comprises a first liquid crystal layer, an area where the first liquid crystal layer is located is divided into a plurality of resonance regions, the antenna element is configured to separately adjust a dielectric constant of the first liquid crystal layer within each of the resonance regions according to the driving voltage signal, to transmit and receive electromagnetic wave in the moving direction corresponding to the driving voltage signal,
wherein the antenna element further comprises:
a driving electrode layer connected to the driver, including a first electrode layer and a second electrode layer at two opposite sides of the first liquid crystal layer, respectively, and configured to generate mutually independent electric fields in respective resonance regions in the first liquid crystal layer according to the driving voltage signal, to adjust dielectric constants of the respective resonance regions of the first liquid crystal layer, at least one of the first electrode layer and the second electrode layer comprising a plurality of driving sub-electrodes insulated and spaced apart from each other, and
an antenna electrode layer at a side of the first electrode layer away from the liquid crystal layer and insulated and spaced apart from the driving electrode layer, the antenna electrode layer including a plurality of antenna sub-electrodes spaced apart from each other, and configured to transmit and receive electromagnetic wave under the electric fields of the respective resonance regions, and cause phase distribution of the electromagnetic wave to correspond to the dielectric constants of the respective resonance regions,
wherein the antenna electrode layer and the driving electrode layer are arranged in one of structures (i) and (ii):
(i) the plurality of antenna sub-electrodes of the antenna electrode layer are arranged in multiple columns and multiple rows, each of the plurality of driving sub-electrodes has a strip shape, the plurality of driving sub-electrodes are in one-to-one correspondence with the resonance regions and spaced apart from each other in a row direction, and an orthographic projection of each driving sub-electrode on a plane where the first electrode layer is located overlap with an orthographic projection of one column of the antenna sub-electrodes on the plane, and
(ii) the plurality of driving sub-electrodes are arranged in multiple columns and multiple rows, each of the plurality of antenna sub-electrodes has a strip shape, the plurality of antenna sub-electrodes are in one-to-one correspondence with the resonance regions and spaced apart from each other in a row direction, and an orthographic projection of each antenna sub-electrode on the plane where the first electrode layer is located overlap with an orthographic projection of one column of the driving sub-electrodes on the plane where the first electrode layer is located.

2. The antenna device according to claim 1, wherein the driving sub-electrodes have one-to-one correspondence with the resonance regions, and
each of the resonance regions corresponds to at least one of the antenna sub-electrodes.

3. The antenna device according to claim 2, wherein the direction detector comprises a gyroscope and an accelerometer.

4. The antenna device according to claim 2, wherein each of the antenna sub-electrodes is formed with a through hole, and each of the resonance regions corresponds to a plurality of rows and a plurality of columns of the antenna sub-electrodes.

5. The antenna device according to claim 4, wherein one of the first electrode layer and the second electrode layer comprises the plurality of driving sub-electrodes, and the other is a single plate electrode.

6. The antenna device according to claim 4, wherein the antenna element further comprises a first substrate and a second substrate opposite to each other, and the first liquid crystal layer is between the first substrate and the second substrate.

7. The antenna device according to claim 2, wherein the direction detector comprises a gyroscope.

8. The antenna device according to claim 1, wherein
each of the resonance regions corresponds to at least one of the plurality of driving sub-electrodes,
the driver further comprises a transmitter configured to generate a magnitude control voltage signal,
the antenna element further comprises a power distribution electrode layer at a side of the second electrode layer facing away the first liquid crystal layer, the power distribution electrode layer comprises a plurality of power distribution sub-electrodes having one-to-one correspondence with the resonance regions, the power distribution sub-electrodes are connected to the transmitter and configured to load the magnitude control voltage signal to adjust magnitudes of electromagnetic wave transmitted by respective resonance regions according to the magnitude control voltage signal,
wherein an orthographic projection of each of the power distribution sub-electrodes on a plane where the first liquid crystal layer is located overlaps at least in part with an orthographic projection of at least one of the antenna sub-electrodes on the plane where the first liquid crystal layer is located.

9. The antenna device according to claim 8, wherein one of the first electrode layer and the second electrode layer comprises the plurality of driving sub-electrodes, and the other is a single plate electrode.

10. The antenna device according to claim 8, wherein the antenna element further comprises a first substrate and a second substrate opposite to each other, and the first liquid crystal layer is between the first substrate and the second substrate.

11. The antenna device according to claim 1, wherein the direction detector comprises a gyroscope and an accelerometer.

12. A mobile apparatus, comprising the antenna device according to claim 1.

13. The mobile apparatus according to claim 12, wherein the mobile apparatus further comprises a display panel, and the display panel comprises an array substrate and a counter substrate opposite to each other and a second liquid crystal layer between the array substrate and the counter substrate,
- in a case where the antenna element further comprises a first substrate and a second substrate opposite to each other and a first liquid crystal layer is between the first substrate and the second substrate, the first liquid crystal layer and the second liquid crystal layer are at a same layer, the first substrate and the counter substrate form an integral structure, and the second substrate and the array substrate form an integral structure.

14. The mobile apparatus according to claim 13, wherein the antenna element is at an edge of the display panel.

15. The antenna device according to claim 1, wherein the direction detector comprises a gyroscope.

16. The antenna device according to claim 15, wherein the direction signal generated by the direction detector undergoes a data calibration of the antenna element.

* * * * *